United States Patent
Komatsu (10) Patent No.: US 9,694,667 B2
(45) Date of Patent: Jul. 4, 2017

(54) WORKING VEHICLE

(71) Applicant: MITSUBISHI MAHINDRA AGRICULTURAL MACHINERY CO., LTD., Shimane-Prefecture (JP)

(72) Inventor: Yukihiro Komatsu, Shimane-Prefecture (JP)

(73) Assignee: MITSUBISHI MAHINDRA AGRICULTURAL MACHINERY CO., LTD., Matsue (JP)

( * ) Notice: Subject to any disclaimer, the term of this patent is extended or adjusted under 35 U.S.C. 154(b) by 0 days.

(21) Appl. No.: 15/184,316

(22) Filed: Jun. 16, 2016

(65) Prior Publication Data

US 2016/0375758 A1    Dec. 29, 2016

(30) Foreign Application Priority Data

Jun. 29, 2015    (JP) .................................. 2015-130297

(51) Int. Cl.
*B60R 16/04*    (2006.01)
*B60K 11/04*    (2006.01)
*F02M 35/02*    (2006.01)

(52) U.S. Cl.
CPC .............. *B60K 11/04* (2013.01); *B60R 16/04* (2013.01); *F02M 35/0201* (2013.01)

(58) Field of Classification Search
CPC ............................... B60K 11/04; B62D 25/084
USPC ................................................. 180/68.4, 68.6
See application file for complete search history.

(56) References Cited

U.S. PATENT DOCUMENTS

| 5,078,223 | A | * | 1/1992 | Ishiwatari | ............ | B62D 21/183 |
| | | | | | | 123/41.49 |
| 5,215,157 | A | * | 6/1993 | Teich | ..................... | B62D 25/10 |
| | | | | | | 180/312 |
| 5,492,167 | A | * | 2/1996 | Glesmann | ................. | B60P 3/32 |
| | | | | | | 123/563 |
| 5,678,648 | A | * | 10/1997 | Imanishi | ................. | F02B 63/02 |
| | | | | | | 180/68.1 |
| 6,105,660 | A | * | 8/2000 | Knurr | ....................... | F01P 3/18 |
| | | | | | | 165/140 |
| 7,051,786 | B2 | * | 5/2006 | Vuk | ........................ | B60K 11/04 |
| | | | | | | 165/122 |
| 7,089,994 | B2 | * | 8/2006 | Esposito | ................ | B60K 11/04 |
| | | | | | | 165/42 |
| 7,383,905 | B2 | * | 6/2008 | Lang | ...................... | B60K 11/04 |
| | | | | | | 180/68.1 |
| 7,938,215 | B2 | * | 5/2011 | Leconte | ................. | B60K 11/04 |
| | | | | | | 165/42 |
| 8,490,730 | B2 | * | 7/2013 | Ringer | ..................... | F16J 12/00 |
| | | | | | | 180/68.1 |

(Continued)

FOREIGN PATENT DOCUMENTS

JP    2010-285006    12/2010

*Primary Examiner* — Jeffrey J Restifo
(74) *Attorney, Agent, or Firm* — Wenderoth, Lind & Ponack, L.L.P.

(57) ABSTRACT

A working vehicle includes a traveling machine body including a bottom plate on which a battery is placed and a radiator bracket for installing a radiator, and a stay. A first end of the stay is fixed at a region close to one side in a width direction of the bottom plate and a second end of the stay is fixed to a vertical frame on the other side in the width direction of the radiator bracket. The stay extends between the first end and the second end by being bent so as to surround one and upper sides of the battery.

4 Claims, 13 Drawing Sheets

(56) References Cited

U.S. PATENT DOCUMENTS

| | | | | |
|---|---|---|---|---|
| 8,590,650 B2* | 11/2013 | Schertz | ............... | F28F 27/00 |
| | | | | 123/41.49 |
| 8,757,313 B2* | 6/2014 | Iwata | ................. | B60K 11/04 |
| | | | | 165/41 |
| 8,783,400 B2* | 7/2014 | Hirukawa | ............ | F01P 3/18 |
| | | | | 180/68.1 |
| 8,925,663 B2* | 1/2015 | Tabeta | ............. | B60H 3/0616 |
| | | | | 180/68.4 |
| 8,950,535 B2* | 2/2015 | Harada | ............. | E02F 9/0866 |
| | | | | 180/296 |
| 9,266,424 B2* | 2/2016 | Golbs | ............... | B60K 5/1208 |
| 2005/0211483 A1* | 9/2005 | Pfohl | ............... | B60K 11/04 |
| | | | | 180/68.1 |
| 2009/0038775 A1* | 2/2009 | Leconte | ............. | B60K 11/04 |
| | | | | 165/67 |
| 2013/0213725 A1* | 8/2013 | Togo | .................. | B60K 5/00 |
| | | | | 180/309 |
| 2013/0327582 A1* | 12/2013 | Kim | .................. | B60R 16/02 |
| | | | | 180/68.3 |
| 2014/0020972 A1* | 1/2014 | Masumoto | ........... | B60K 11/06 |
| | | | | 180/309 |
| 2016/0375758 A1* | 12/2016 | Komatsu | ............. | B60K 11/04 |
| | | | | 180/68.4 |

* cited by examiner

WORKING VEHICLE

BACKGROUND OF THE INVENTION

Field of the Invention

The present invention relates to a working vehicle such as a tractor.

Description of the Related Art

Hitherto, a bonnet unit forming an engine room of a tractor is composed of a front grill covering a front part, left and right side covers covering left and right side parts, and a bonnet hood covering an upper part of the engine room. The left and right side covers are attached removably to a fixed member, and a rear part of the bonnet hood is pivotally supported by a rear support frame, i.e., a fixed member, such that the hood is openable. Still further, as disclosed in Japanese Patent Application No. 2010-285006 for example, a gate-shaped stay is provided on a bottom plate of the engine room such that both ends of the stay are fixed to the bottom plate, and the front grill is removably attached to the stay.

The bottom plate of the engine room is disposed on a front side of a machine body to which a radiator bracket configured to attach a radiator is integrally fixed. A battery is mounted on the bottom plate. The battery is disposed so as to be surrounded by the gate-shaped stay to be protected by the stay.

While an air cleaner is attached to an upper part of the stay through a bracket, a function of the stay itself reinforcing the radiator bracket and the bottom plate is not enough because both ends of the stay bent downward are fixed to the bottom plate and the stay is fixed onto the bottom plate separately and in parallel with the radiator bracket. Rigidity of the stay is not also enough.

Still further, because left, right, and upper sides of the battery placed on the bottom plate are surrounded by the gate-shaped stay as described above, the battery can be taken in/out of only the front part of the machine body. Thus, it has been a cumbersome and difficult work to mount/dismount the heavy battery within a narrow space.

SUMMARY OF THE INVENTION

According to one aspect of the invention, a working vehicle includes an engine, a radiator, a battery, and a traveling machine body supported by wheels and configured to support the engine, the radiator, and the battery in a front part thereof. The traveling machine body includes a bottom plate on which the battery is placed and a radiator bracket for installing the radiator. The working vehicle further includes a stay whose first end is fixed at a region close to one side in a width direction of the bottom plate and whose second end is fixed to a vertical frame on the other side in the width direction of the radiator bracket. The stay is configured to extend between the first end and the second end by being bent so as to surround one and upper sides of the battery.

Further features of the present invention will become apparent from the following description of exemplary embodiments with reference to the attached drawings. The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
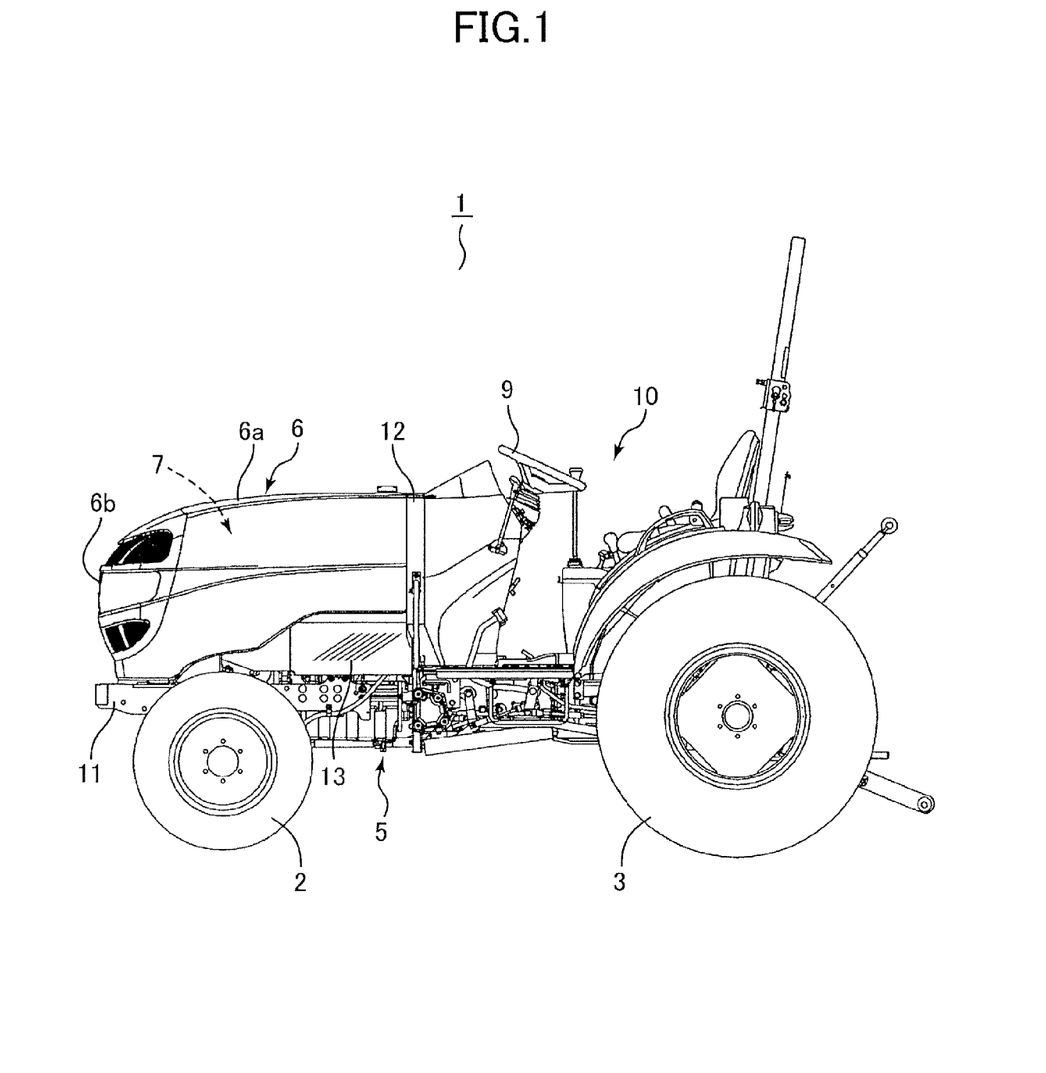
FIG. 1 is a side view illustrating a tractor of the present embodiment.

An embodiment of a working vehicle of the present embodiment will be described below with reference to the drawings. It is noted that in terms of the drawings, a direction in which the working vehicle normally travels will be expressed as a 'front' direction (travelling direction) and a direction opposite to the front direction will be expressed as a 'rear' direction. 'Left' and 'right' directions are those in terms of the travelling direction. As illustrated in FIG. 1, a tractor 1, i.e., the working vehicle, of the present embodiment includes a traveling machine body 5 suspended by wheels, i.e., front and rear wheels 2 and 3. The traveling machine body 5 includes an engine room 7 located in a front part thereof and covered by a bonnet 6. A driver's seat 10 including a steering wheel 9 and others is located at a rear part of the traveling machine body 5.

Figure 2:
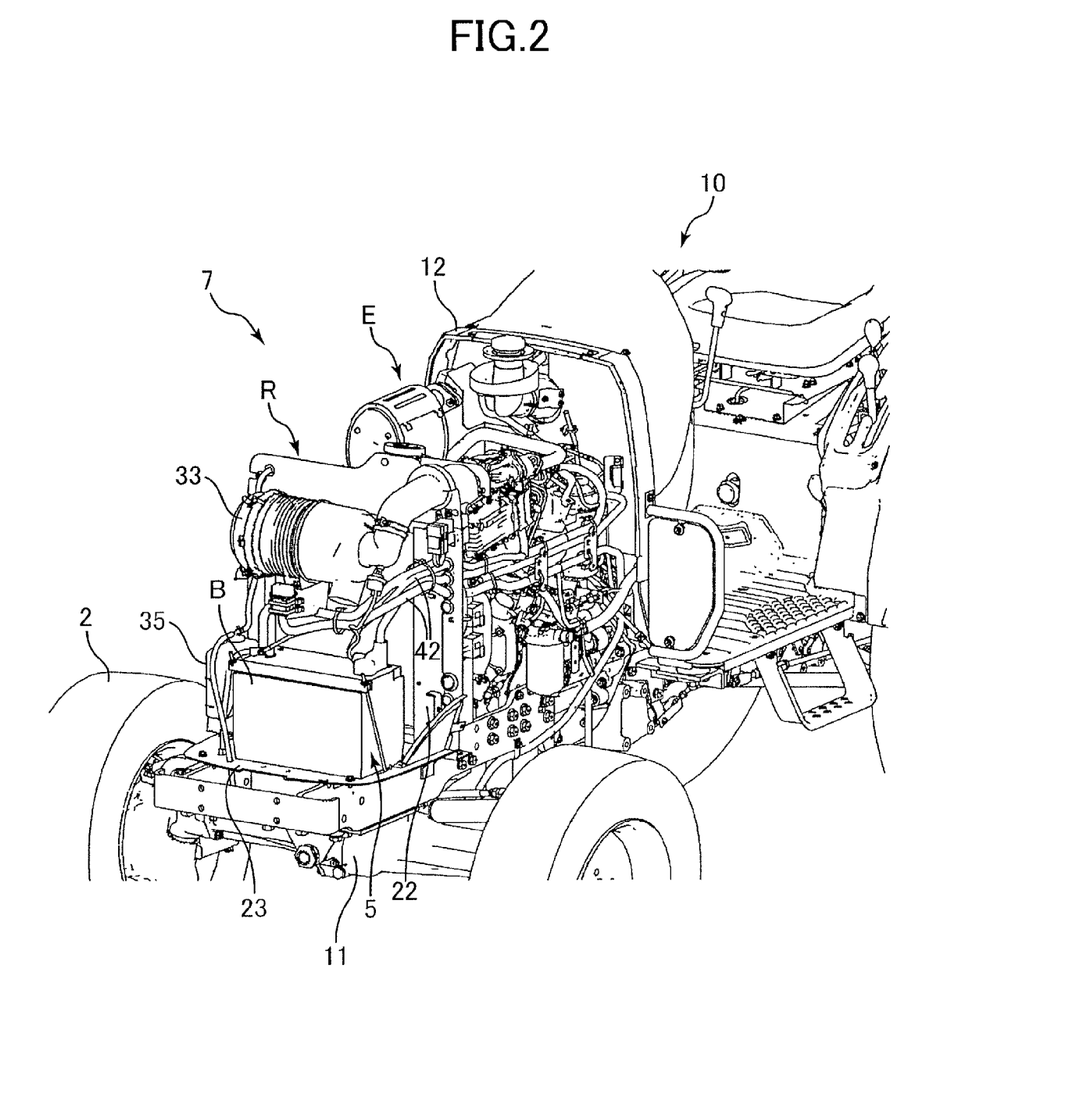
FIG. 2 is a perspective view illustrating a front part of an engine room.

As illustrated in FIG. 2, the engine room 7 includes an engine E and a front frame 11 extending forward from left and right sides of the engine E. A radiator R is disposed in front of the engine E. The radiator R is attached to a radiator bracket 22 fixed to the front frame 11 described above. A bottom plate (radiator bracket bottom plate) 23 is fixed so as to be placed on the front frame 11 in front of the radiator bracket 22, and a battery B is mounted on the bottom plate 23. A rear part of the engine E is parted from the driver's seat 10 by a rear support plate 12.

Figure 3:
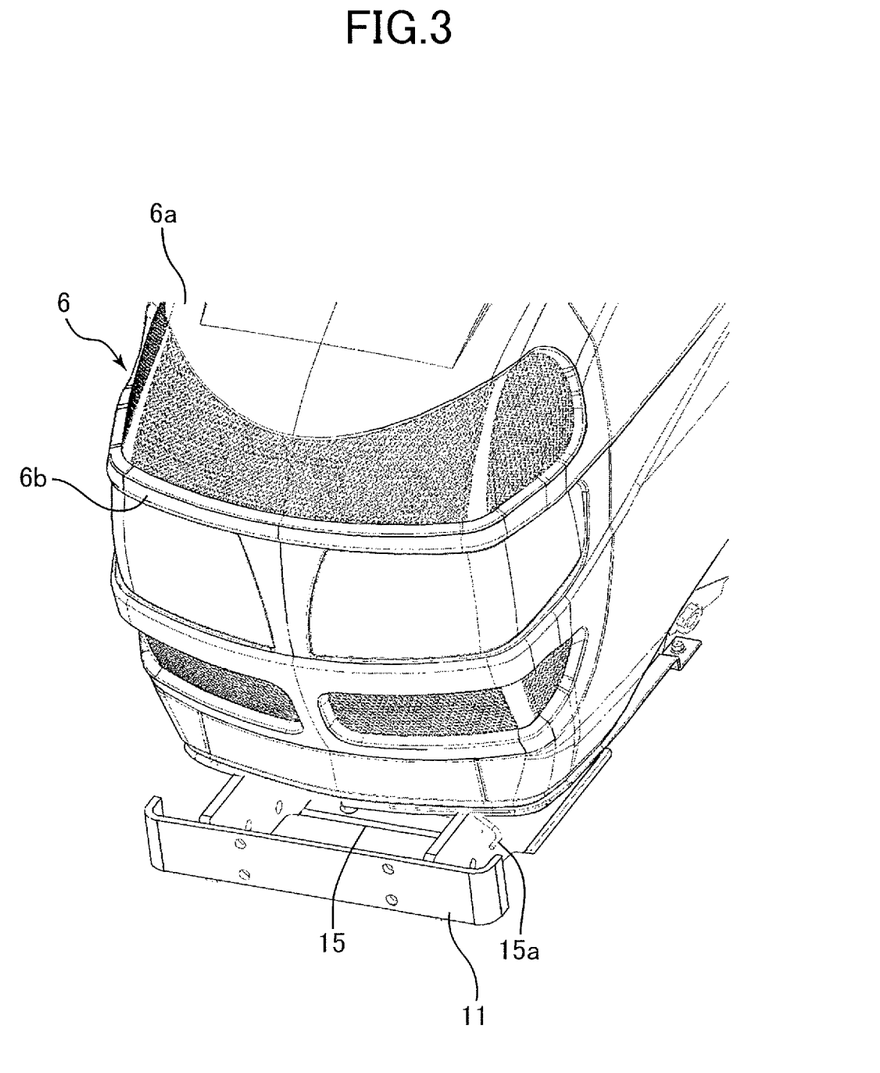
FIG. 3 is a perspective view illustrating a front part of a bonnet.
Figure 4:
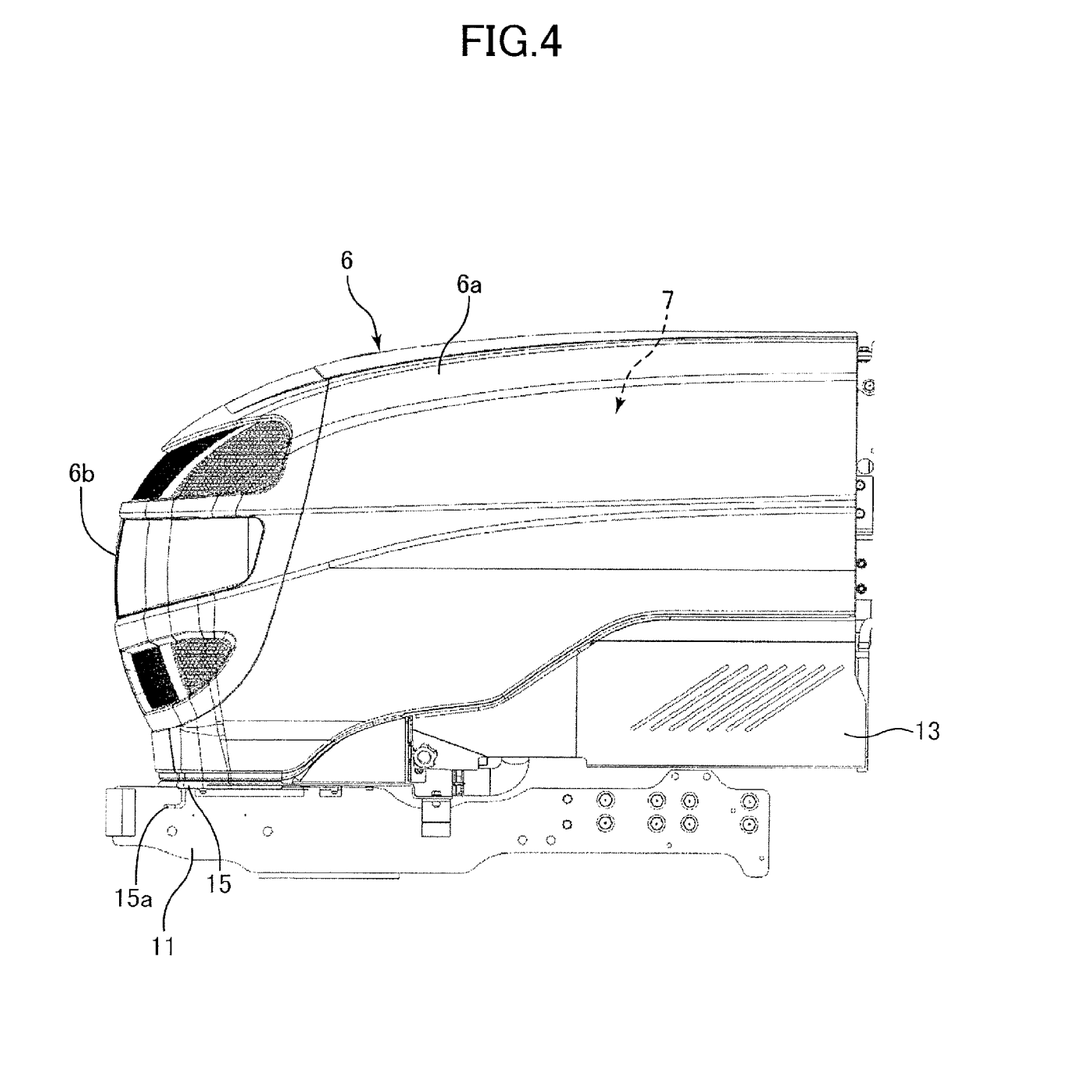
FIG. 4 is a side view illustrating the bonnet.

As illustrated in detail in FIGS. 3 and 4, the bonnet 6 is formed of one-piece member in which a hood portion 6a made of a sheet metal and covering an upper part and an upper portion of a side part of the engine room 7 is integrated with a front grill 6b covering the front part of the engine room 7 and is openable at a fulcrum of an upper part of the rear support plate (rear support frame) 12 partitioning the engine room 7 from the driver's seat 10. Side covers 13 are disposed on left and right sides of a lower rear part of the bonnet 6. These side covers 13 are removably fixed to fixed members such as the front frame 11 and the rear support plate 12.

Figure 5:
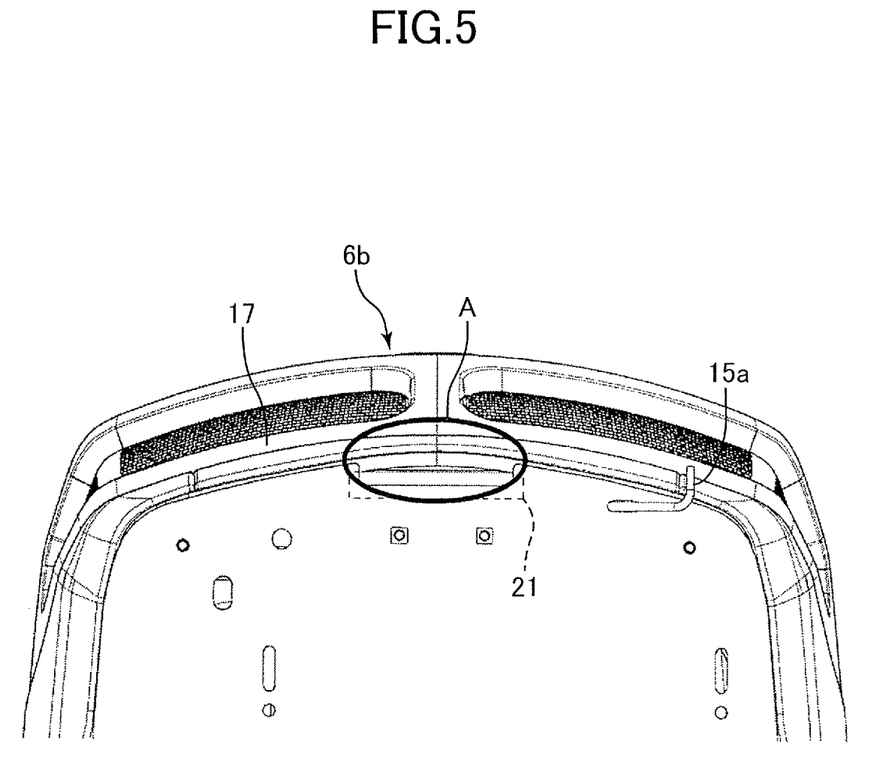
FIG. 5 is a bottom view of a front portion of the bonnet viewed from underneath thereof.
Figure 6:
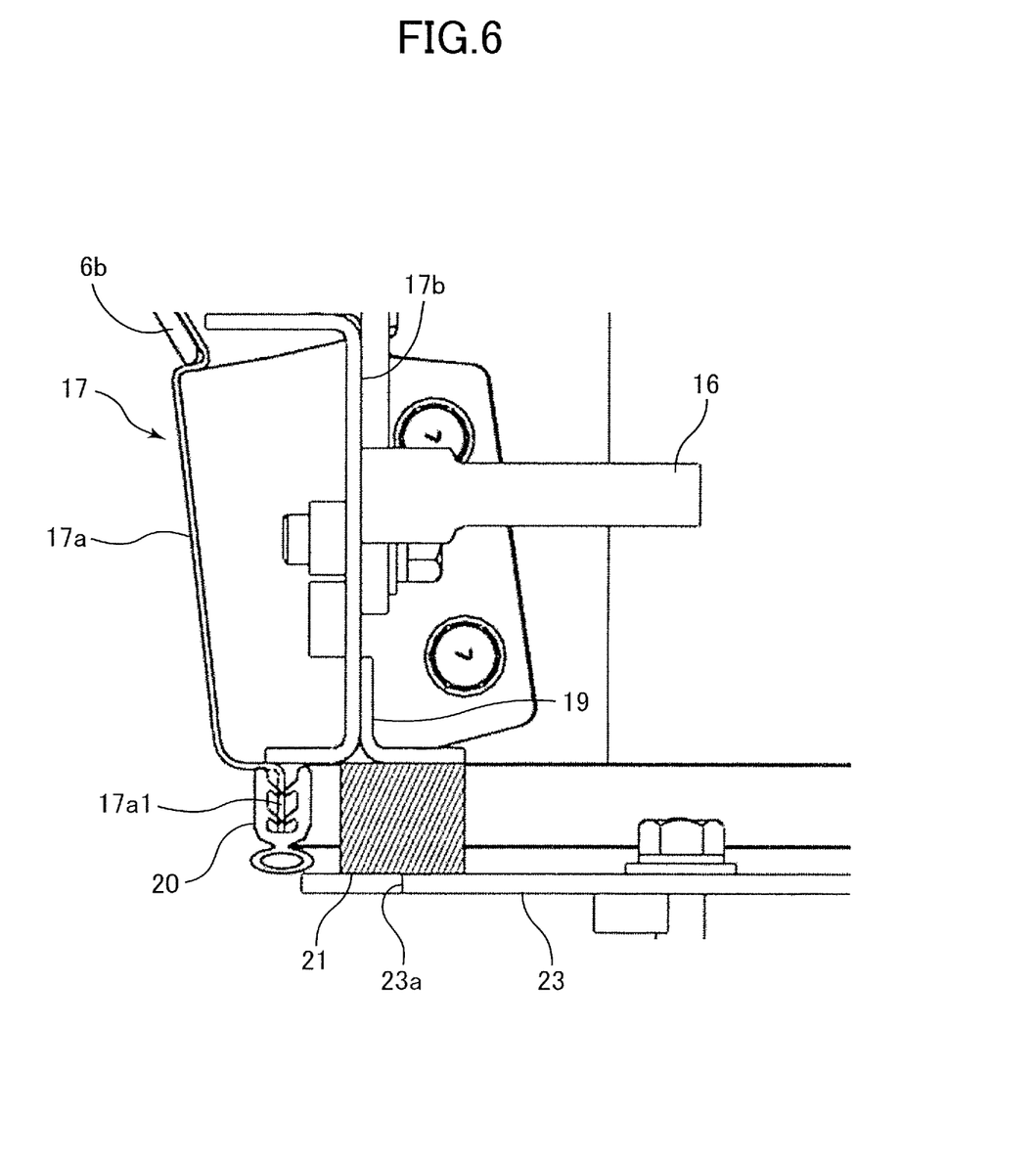
FIG. 6 is a section view of the front portion of the bonnet.
Figure 7:
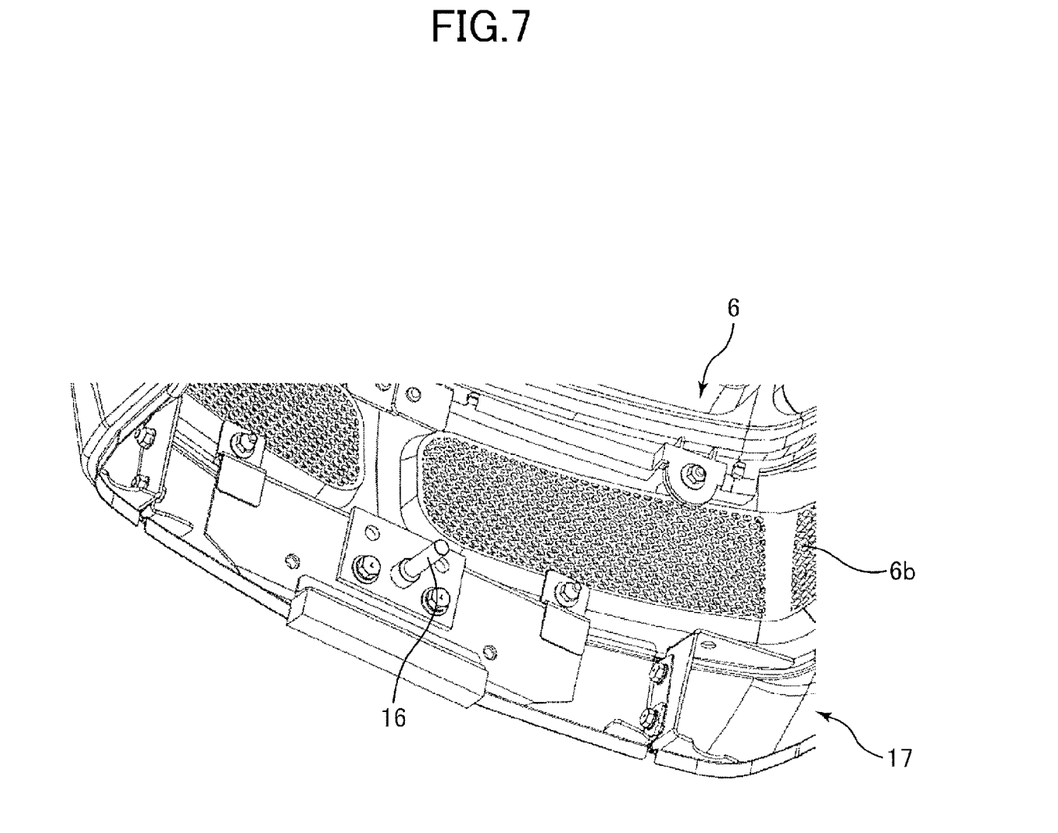
FIG. 7 is a perspective view of the front portion of the bonnet viewed from a back side thereof.

An opening/closing rod 15 is disposed movably in a left-right direction at the front part of the traveling machine body 5. A left end of the opening/closing rod 15 is bent and is exposed out of the bonnet 6 to be an operating portion 15a. A center part of the opening/closing rod 15 is connected with a latch not illustrated. As illustrated in FIGS. 6 and 7, an engage pin 16 is fixedly provided at a center part of a back surface of the front grill 6b, and the latch can fix the bonnet 6 at a close position by engaging with the engage pin 16. As illustrated in FIGS. 5 and 6, an undercover 17 is disposed under the front grill 6b along a lower edge of the front grill 6b. The undercover 17 is composed of a surface plate 17a formed of a thin plate and a strength member 17b formed into a shape of U in section and integrally secured with the surface plate 17a. The engage pin 16 is fixed at a center part of the strength member 17b so as to project to the rear side (project from the back surface of the undercover 17). Still further, an L-shaped plate 19 is integrally fixed by welding to the center part of the strength member 17b such that a lower surface thereof is in flush with a lower surface of the strength member 17b. A lower edge of a surface plate 17a is formed into a flange 17a1 projecting downward, and a weather strip 20 is attached to the flange 17a1 to prevent rainwater from entering the bonnet 6.

Figure 8:
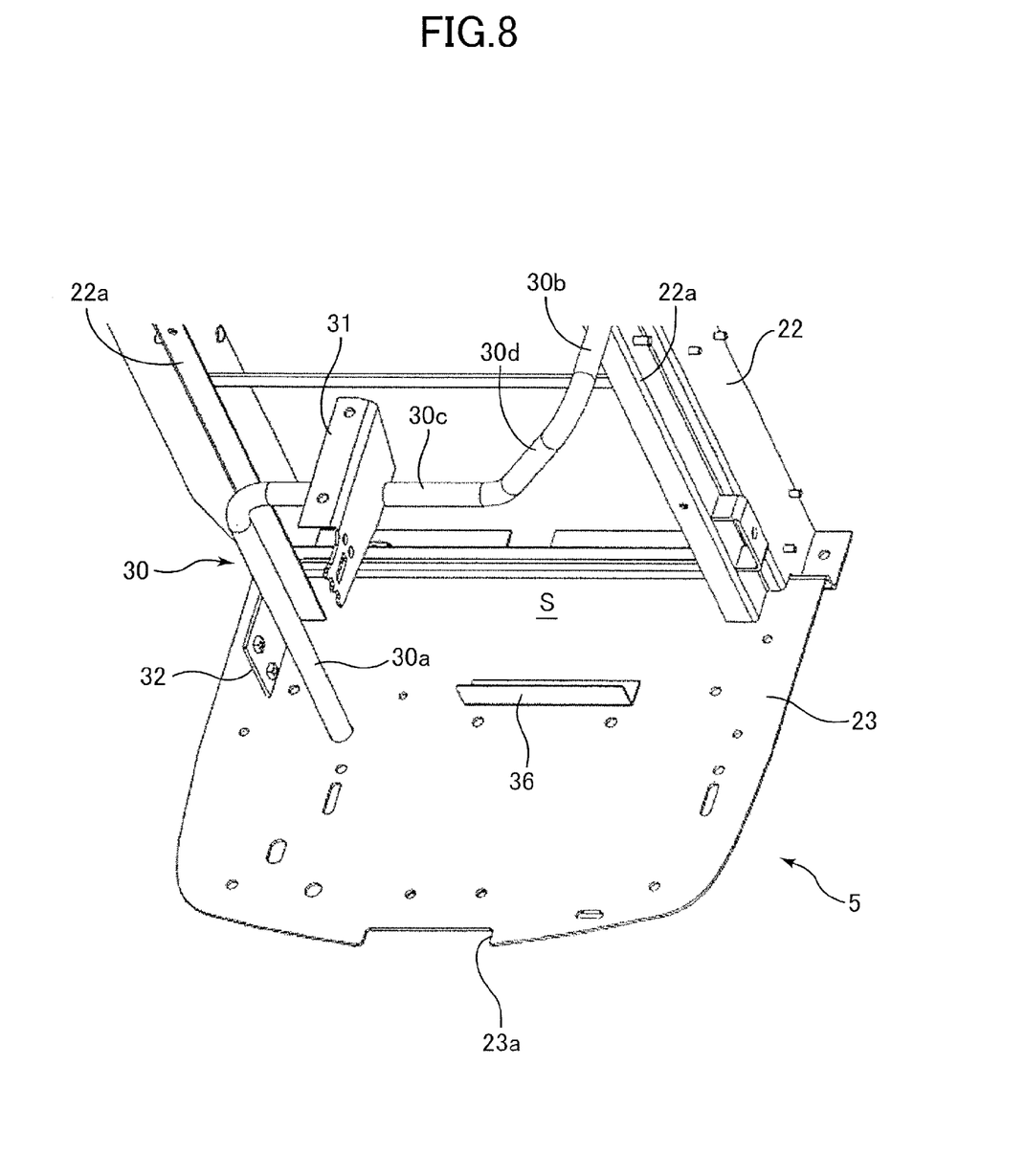
FIG. 8 is a perspective view illustrating a bottom plate of the front part of the bonnet.

A cushion 21 formed of a rubber sponge is pasted on the lower surface of the L-shaped plate 19. As illustrated in FIG. 8, vertical frames 22a are integrally fixed to front, rear, left and right parts of the radiator bracket 22. The vertical frames 22a are integrally fixed to the bottom plate (radiator bracket bottom plate) 23. A U-shaped cutaway portion 23a is provided at a center part of a front edge of the bottom plate 23. When the bonnet 6 is closed, the cushion 21 abuts with the bottom plate 23 so as to cover the cutaway portion 23a. The cushion 21 is compressed by a predetermined amount and closes the cutaway portion 23a, thus preventing foreign matters from entering the front part of the radiator from the outside of the bonnet 6.

In opening the closed bonnet 6, an operator hooks his/her finger of one hand to the operating portion 15a and pulls the opening/closing rod 15 to disengage the engage pin 16 from the latch. Then, in this state, the operator inserts a finger of another hand into the cutaway portion 23a of the bottom plate 23 from a part A in FIG. 5 and touches the cushion 21. Next, the operator supports the cushion 21 by the finger and lifts up the bonnet 6 centering on the rear part thereof.

Because the finger is inserted into the cutaway portion 23a of the bottom plate 23 from the part A in FIG. 5 and no structure for lifting up the bonnet 6 such as a grip, a recess, or the like needs to be provided on the bonnet 6 or the front grill 6b part in particular, there is no influence on an appearance of the bonnet 6. Still further, because the operator lifts the bonnet 6 by holding the cushion 21, a less burden is applied to the finger and the operator can readily lift up the bonnet 6 even if the bonnet 6 is an integrated type heavy bonnet. Still further, because the cushion 21 is made of the rubber sponge, the cushion 21 does not absorb water and the operator can keep his/her hand clean and dry in opening the bonnet 6 even if the tractor 1 is wet by rain or the like.

Next, a reinforced structure of the engine room 7 will be described with reference to FIGS. 9 through 13D. The radiator bracket 22 includes the pair of left and right vertical frames 22a and a transverse plate 22b connecting upper ends of the vertical frames 22a. Lower ends of the vertical frames 22a are integrally fixed with the bottom plate 23 so that the radiator bracket 22 is reinforced. A reinforcing stay 30 is disposed in the front part of the engine room 7 above the bottom plate 23. First end (one end) G of the stay 30 is welded onto the bottom plate 23 and a second end (the other end) H thereof is welded onto one vertical frame 22a. The stay 30 is one pipe member extending while being bent between the first end G and the second end H thereof. More specifically, as illustrated in detail in FIGS. 13A through 13D, the stay 30 is composed of a vertical portion 30a extending upward from the first end G welded on the right side of a center part in the front-rear direction of the bottom plate 23, a longitudinal portion 30b extending forward in a horizontal direction from the second end H welded to the left vertical frame 22a, a transverse portion 30c extending to the left side from an upper end of the vertical portion 30a horizontally in a width direction, and an oblique portion 30d extending obliquely in a plane vertical to an axial line in the front-rear direction of the machine body and connecting an end part of the transverse portion 30c with an end part of the longitudinal portion 30b. Accordingly, an open space S is provided on left and front sides of the stay 30, and no pillar part extending in the vertical direction exists on the left side, like the prior art gate type stay. It is noted that the respective parts 30a through 30d of the stay 30 are connected by curved portions. A bracket 31 configured to fix an air cleaner is integrally fixed to the transverse portion 30c of the stay 30, and a lug 32 configured to attach a reservoir tank is integrally fixed to the vertical portion 30a.

Figure 9:
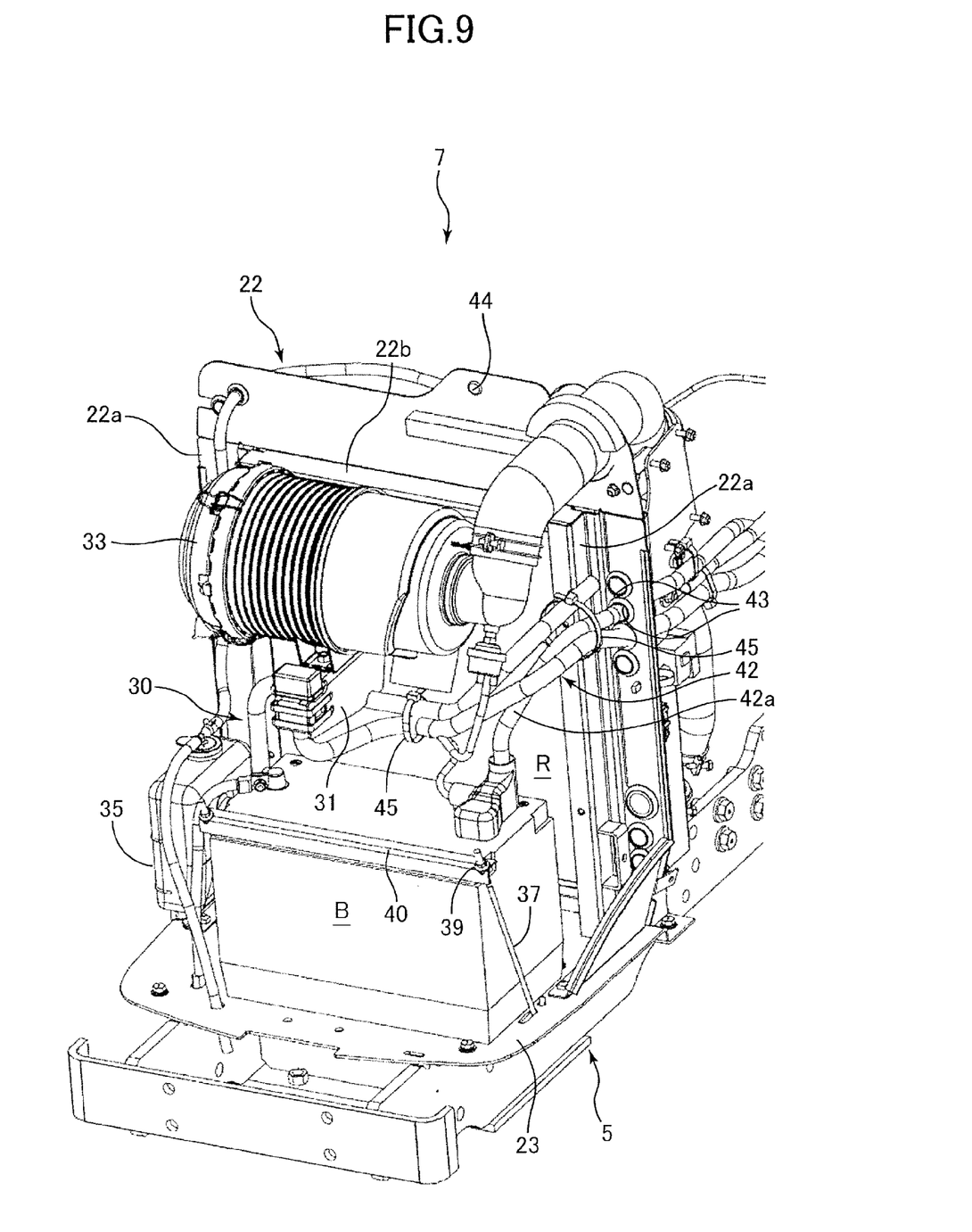
FIG. 9 is a perspective view illustrating the engine room part.
Figure 10:
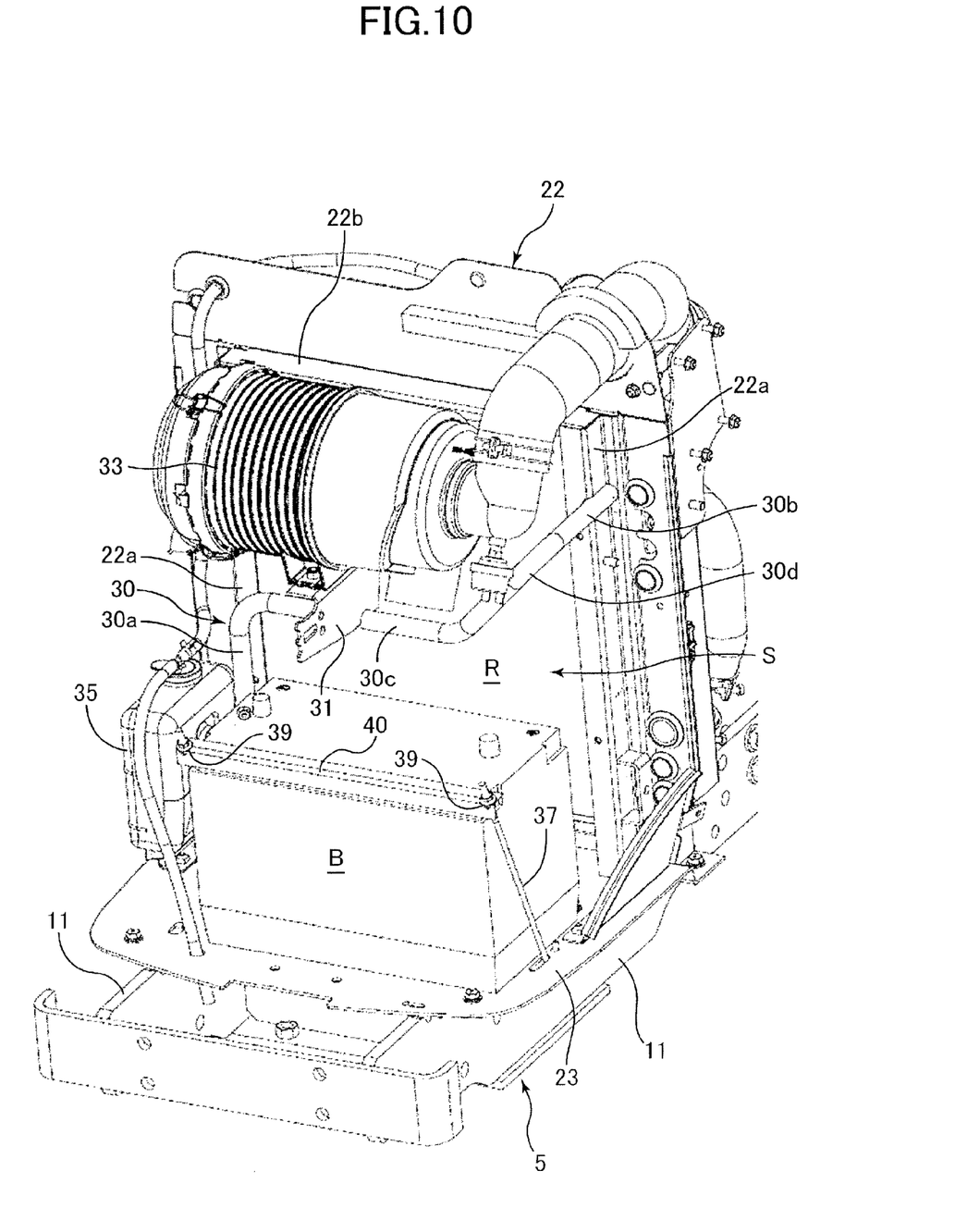
FIG. 10 is a perspective view illustrating the front part of the engine room.
Figure 11:
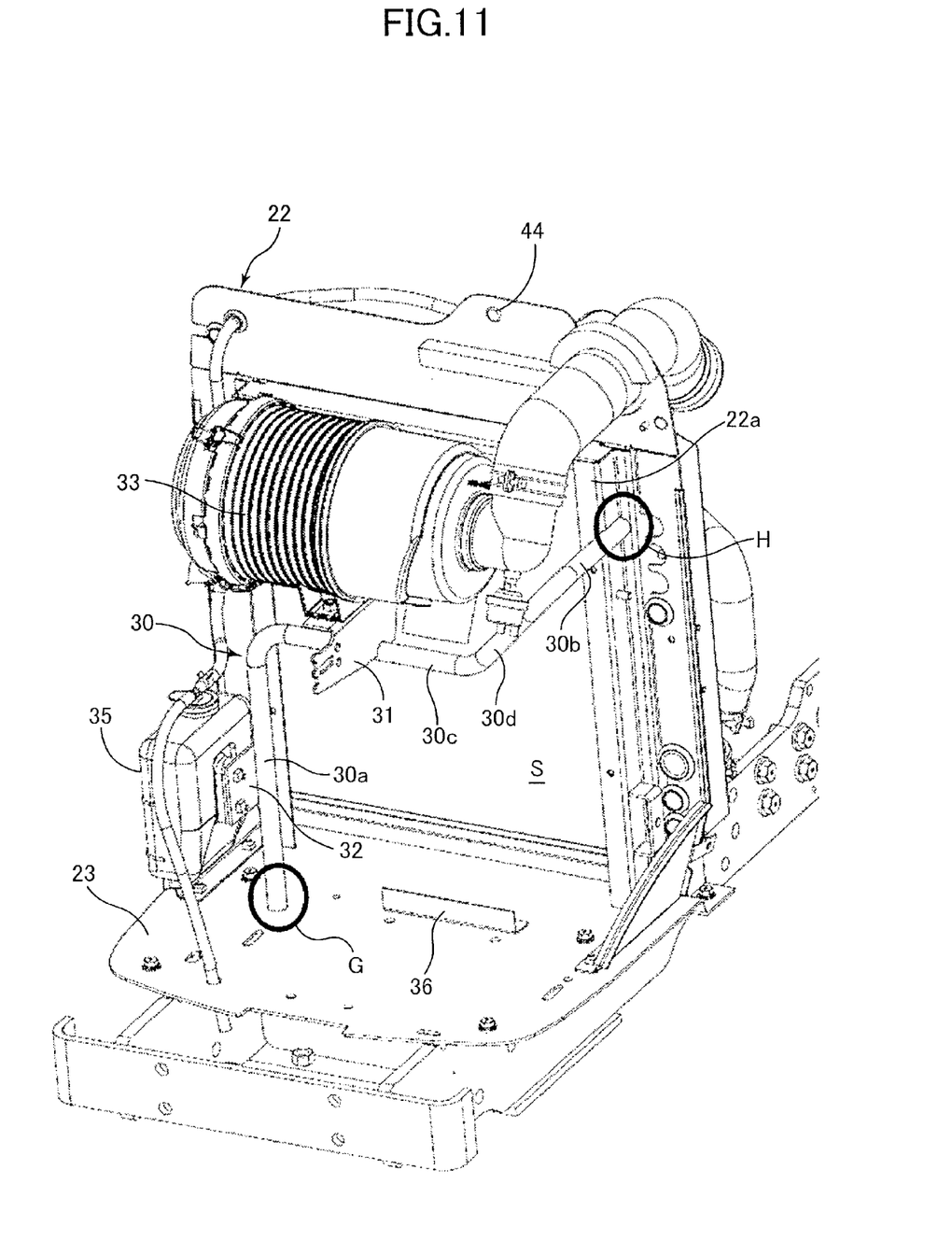
FIG. 11 is a perspective view illustrating the front part of the engine room from which a battery is taken out.

As illustrated in FIGS. 9 through 11, the air cleaner 33 is attached by the bracket 31 above the stay 30 and in front of the radiator R, and the reservoir tank 35 is attached by the lug 32 on the left side of the stay 30 and in front of the radiator R. Then, the battery B is inserted from an opened left front side of the stay 30 and is placed on the bottom plate 23. The battery B is positioned by abutting with the vertical portion 30a of the stay 30 and the L-shape plate 36 on the bottom plate. Then, the battery B is fixed on the bottom plate 23 by hooking fixtures 37 to the bottom plate 23 and by fastening nuts 39 of the fixtures 37.

Figure 12:
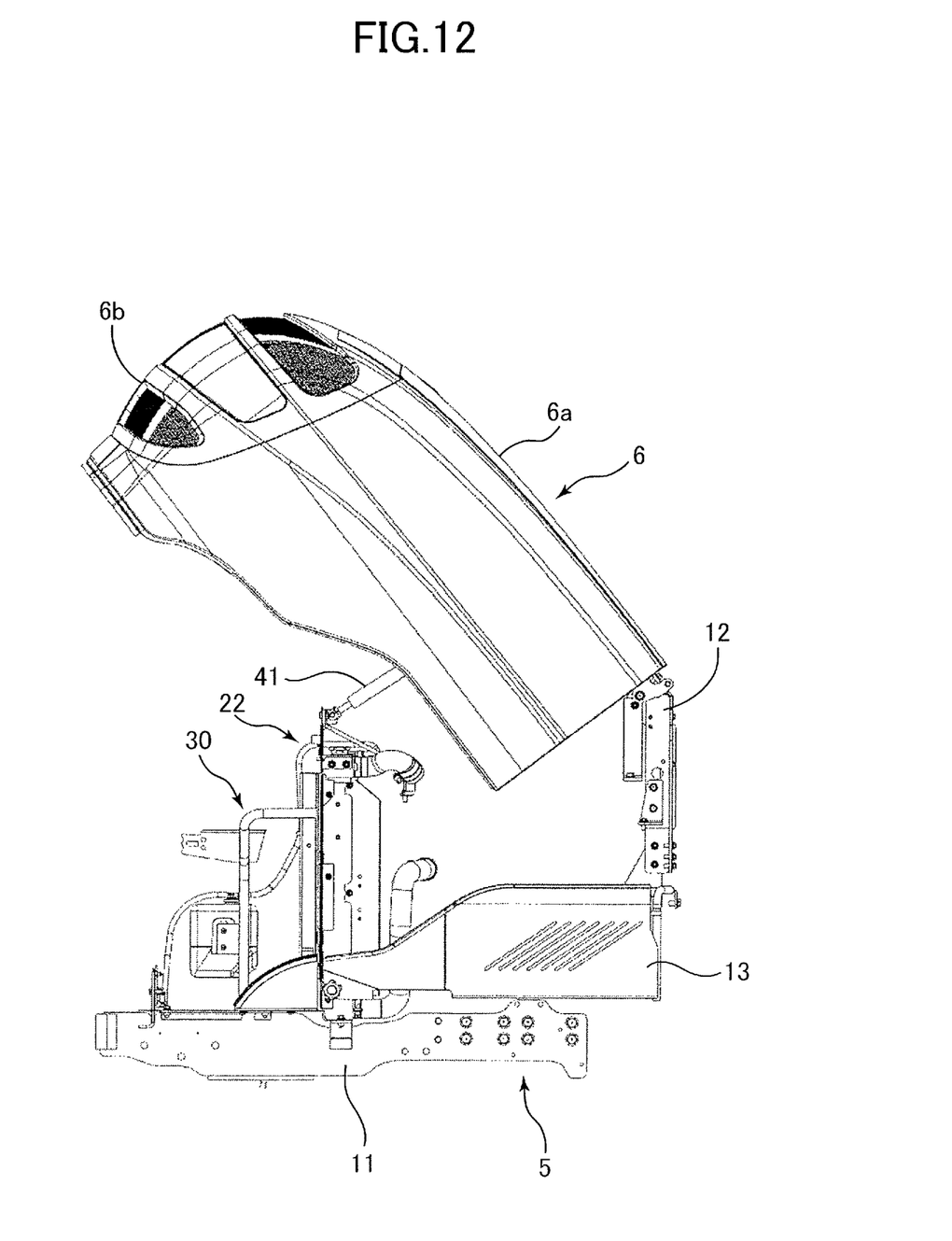
FIG. 12 is a side view illustrating a state in which the bonnet is opened.
Figure 13A:
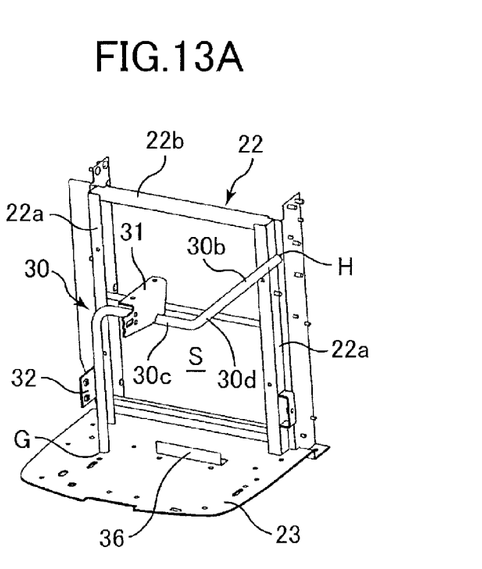
FIG. 13A is a perspective view illustrating the stay.
Figure 13B:
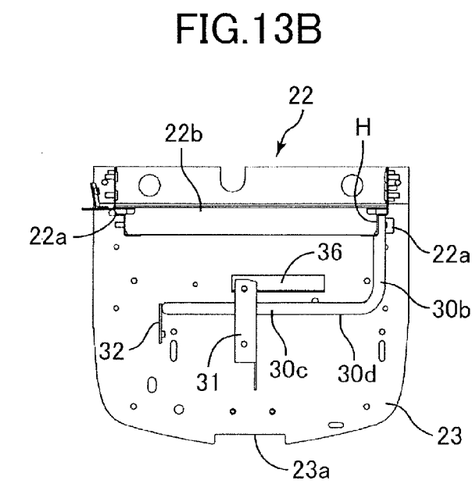
FIG. 13B is a plan view illustrating the stay.
Figure 13C:
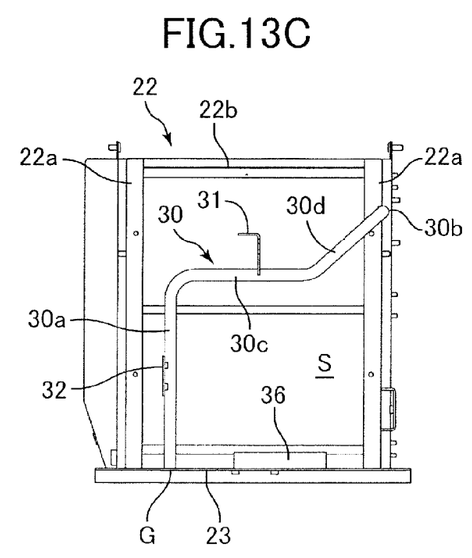
FIG. 13C is a front view illustrating the stay.
Figure 13D:
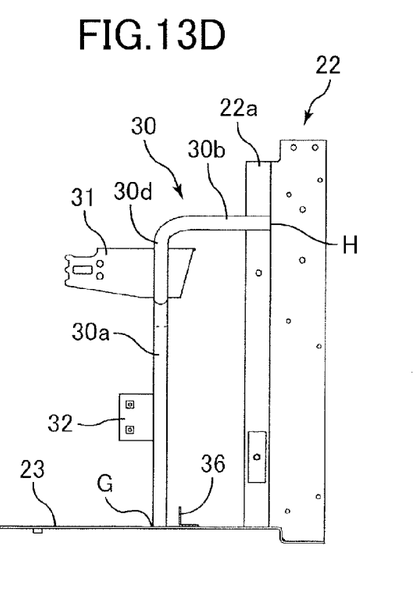
FIG. 13D is a side view illustrating the stay.

As illustrated in FIGS. 11 and 12, a rod 41 is attached to a hole 44 provided at an upper part of the radiator bracket 22. The rod 41 holds the bonnet 6 at the open position in a state in which the bonnet 6 is opened. Accordingly, a large load from the heavy bonnet 6 acts on the radiator bracket 22.

As illustrated in FIG. 9, a plurality of harnesses 42 such as a harness 42a connected to a plus terminal of the battery B penetrates through holes 43 provided through the radiator bracket 22 and extends to the front part of the traveling machine body 5. These harnesses 42 are bound to the stay 30, i.e., a round pipe, by binders 45 and are supported by the stay 30. Accordingly, each harness 42 is supported so as to run along the edgeless stay 30. Thus, each harness 42 interferes less with edges of other members, and wiring position of each harness is clarified. This arrangement makes it easy to maintain the engine room 7.

The air cleaner 33 and the reservoir tank 35 are attached to the stay 30 as described above and are liable to resonate due to vibrations of the engine E. The stay 30 is formed of the round pipe connecting the bottom plate 23 with the one vertical frame 22a of the radiator bracket 22 by the bent structure. Accordingly, in addition to that rigidity of the stay 30 itself is high, strength of the radiator bracket 22 and the bottom plate 23 is enhanced by the structure of the highly rigid stay 30 obliquely connecting the one vertical frame 22a of the radiator bracket 22 with the bottom plate 23 diagonally in plan and front views. This arrangement makes it possible to reduce resonance, deformation, or the like of the members such as the air cleaner 33 attached to the stay 30. Still further, because the strength of the radiator bracket 22 is boosted, it is possible to hold the heavy bonnet 6 in the open position highly reliably without deforming the bracket 22.

That is, the stay 30 is configured such that the first end thereof is fixed at a region close to the one side in the width direction of the bottom plate 23 and the second end thereof is fixed to the vertical frame 22a on the other side in the width direction of the radiator bracket 22, and the stay 30 is configured to extend between the first end and the second end by being bent so as to surround the one and upper parts of the battery B. Therefore, it is possible to boost the strength of the radiator bracket and the rigidity of the stay which are required to be strong to support the bonnet in the opened condition and to prevent the resonance or the like required in attaching auxiliary machines such as the air cleaner. Thus, it is possible to boost the strength without additional reinforcements and to cut the cost.

Still further, the stay 30 defines the open space on a side of the second end of the stay as a space enabling the battery B to be taken in/out of the engine room 7. That is the stay 30 defines the open space enabling the battery to be taken in/out at a front space ahead of the second end of the stay. Therefore, it is possible to readily attach and dispose the heavy battery B onto the bottom plate 23 from the open space S made by the stay 30. Thus, it is possible to enhance the maintenability of the engine room 7. The right and upper sides of the battery B set on the predetermined position are surrounded and held by the stay 30. Still further, because the air cleaner 33 is attached to the transverse portion 30c above the battery B through the bracket, it is possible to reduce the resonance of the air cleaner 33 based on the highly rigid stay 30.

Still further, as described above, the stay 30 is composed of the one continuous round pipe including the vertical portion 30a extending upward from the first end G fixed to the bottom plate 23, the longitudinal portion 30b extending forward from the second end H fixed to the vertical frame 22a, the transverse portion 30c extending horizontally in the width direction from the upper end of the vertical portion 30a, and the oblique portion 30d extending obliquely and connecting the end part of the transverse portion 30c with the end part of the longitudinal portion 30b. Therefore, it is possible to form the bracket 31 for attaching the air cleaner on the transverse portion 30c and to readily form the open space S. Still further, because the stay 30 is composed of one round pipe, it is possible to support the harnesses 42 by the edgeless round pipe and to prevent the harnesses 42 from being damaged by edges. The stay 30 also facilitates the wiring of the harnesses 42, enhances the maintenability, and cuts the cost of the engine room 7.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-130297, filed on Jun. 29, 2015, which is hereby incorporated by reference herein in its entirety.

What is claimed is:

1. A working vehicle, comprising:
   an engine;
   a radiator;
   a battery;
   a traveling machine body supported by wheels and configured to support the engine, the radiator, and the battery in a front part thereof, the traveling machine body comprising a bottom plate on which the battery is placed and a radiator bracket for installing the radiator;
   an air cleaner located above the battery; and
   a stay whose first end is fixed at a region close to one side in a width direction of the bottom plate and whose second end is fixed to a vertical frame on the other side in the width direction of the radiator bracket, the stay being configured to extend between the first end and the second end by being bent so as to surround one and upper sides of the battery, the stay comprising:
      a vertical portion extending upward from the first end at the one side in the width direction of the battery; and
      a transverse portion extending in the width direction through a gap between the battery and the air cleaner in a vertical direction.

2. The working vehicle according to claim 1, wherein the stay is configured such that the air cleaner is attached to the transverse portion through the bracket above the battery and to define an open space on a side of the second end of the stay as a space enabling the battery to be taken in and out.

3. The working vehicle according to claim 1, wherein the stay is composed of one continuous round pipe and comprises a longitudinal portion extending forward from the second end fixed to the vertical frame, and an oblique portion extending obliquely and connecting an end part of the transverse portion with an end part of the longitudinal portion, and
   the transverse portion extending horizontally in the width direction from an upper end part of the vertical portion.

4. A working vehicle, comprising:
   an engine;
   a radiator;
   a battery;
   a traveling machine body supported by wheels and configured to support the engine, the radiator, and the battery in a front part thereof, the traveling machine body comprising a bottom plate on which the battery is placed and a radiator bracket for installing the radiator; and
   a stay whose first end is fixed at a region close to one side in a width direction of the bottom plate and whose second end is fixed to a vertical frame on the other side in the width direction of the radiator bracket, the stay being configured to extend between the first end and the second end by being bent so as to surround one and upper sides of the battery,
   wherein the stay is composed of one continuous round pipe comprising a vertical portion extending upward from the first end fixed to the bottom plate, a longitudinal portion extending forward from the second end fixed to the vertical frame, a transverse portion extending horizontally in the width direction from an upper end part of the vertical portion, and an oblique portion extending obliquely and connecting an end part of the transverse portion with an end part of the longitudinal portion.

* * * * *